(12) United States Patent
Ward et al.

(10) Patent No.: US 8,991,868 B2
(45) Date of Patent: Mar. 31, 2015

(54) SPLASH GUARD ATTACHMENT CLIP ASSEMBLY

(75) Inventors: Douglas Kenneth Ward, Toronto (CA); Ken Miller, Scarborough (CA); Ken Lott, Whitby (CA); Edward Kish, Scarborough (CA)

(73) Assignee: Powerflow, Inc., Buffalo, NY (US)

( * ) Notice: Subject to any disclaimer, the term of this patent is extended or adjusted under 35 U.S.C. 154(b) by 599 days.

(21) Appl. No.: 13/309,955

(22) Filed: Dec. 2, 2011

(65) Prior Publication Data

US 2013/0140804 A1 Jun. 6, 2013

(51) Int. Cl.
*B62D 25/18* (2006.01)
*F16M 13/02* (2006.01)
*F16B 2/20* (2006.01)

(52) U.S. Cl.
CPC ............ *B62D 25/18* (2013.01); *F16M 13/02* (2013.01); *F16B 2/20* (2013.01)
USPC .......................................... 280/851; 280/154

(58) Field of Classification Search
USPC ................... 280/847, 848, 851, 154
See application file for complete search history.

(56) References Cited

U.S. PATENT DOCUMENTS

| | | | | |
|---|---|---|---|---|
| 1,809,711 A | | 6/1931 | Kile | |
| 2,012,921 A | * | 8/1935 | Bahr | 280/851 |
| 2,054,361 A | | 9/1936 | Cohen | |
| 2,137,652 A | * | 11/1938 | Lundberg et al. | 24/458 |
| 2,137,653 A | * | 11/1938 | Lundberg | 24/458 |
| 2,137,657 A | * | 11/1938 | Ross | 24/458 |
| 3,556,570 A | * | 1/1971 | Cosenza | 411/176 |
| 3,674,246 A | * | 7/1972 | Freeman | 261/114.1 |
| 4,323,262 A | * | 4/1982 | Arenhold | 280/851 |
| 4,605,238 A | * | 8/1986 | Arenhold | 280/851 |
| 4,709,938 A | | 12/1987 | Ward et al. | |
| 5,048,868 A | * | 9/1991 | Arenhold | 280/848 |
| 5,722,690 A | | 3/1998 | Ward et al. | |
| 6,382,675 B1 | * | 5/2002 | Furuse et al. | 280/847 |
| 6,892,427 B2 | | 5/2005 | Kinzel | |
| 7,578,526 B2 | * | 8/2009 | Jaeger | 280/848 |
| 2007/0216128 A1 | * | 9/2007 | Morton | 280/154 |
| 2008/0001390 A1 | * | 1/2008 | Iverson | 280/848 |

FOREIGN PATENT DOCUMENTS

| | | | | |
|---|---|---|---|---|
| DE | 3525947 C1 | * | 1/1987 | F16B 5/02 |
| JP | 03213705 A | * | 9/1991 | F16B 5/02 |

* cited by examiner

*Primary Examiner* — J. Allen Shriver, II
*Assistant Examiner* — Bridget Avery
(74) *Attorney, Agent, or Firm* — Tarolli, Sundheim, Covell & Tummino LLP

(57) ABSTRACT

An attachment clip assembly for securing a splash guard to an edge of a vehicle panel. The attachment clip assembly includes inner and outer clips and a threaded fastener. The inner clip includes wedging and gripping arms and the outer clip includes wedging and support arms, the inner clip fitting in nested relationship in the outer clip. The threaded fastener extends through an opening of the inner clip and a slotted opening of the outer clip. The wedging arm of the outer clip includes spaced apart shoulders overlying respective outer edges of the wedging arm of the inner clip such that, upon tightening the threaded fastener, the wedging arm of the inner clip slides along the wedging arm of the outer clip in a direction toward a central portion of the outer clip thereby moving the inner clip gripping arm toward the outer clip support arm.

21 Claims, 10 Drawing Sheets

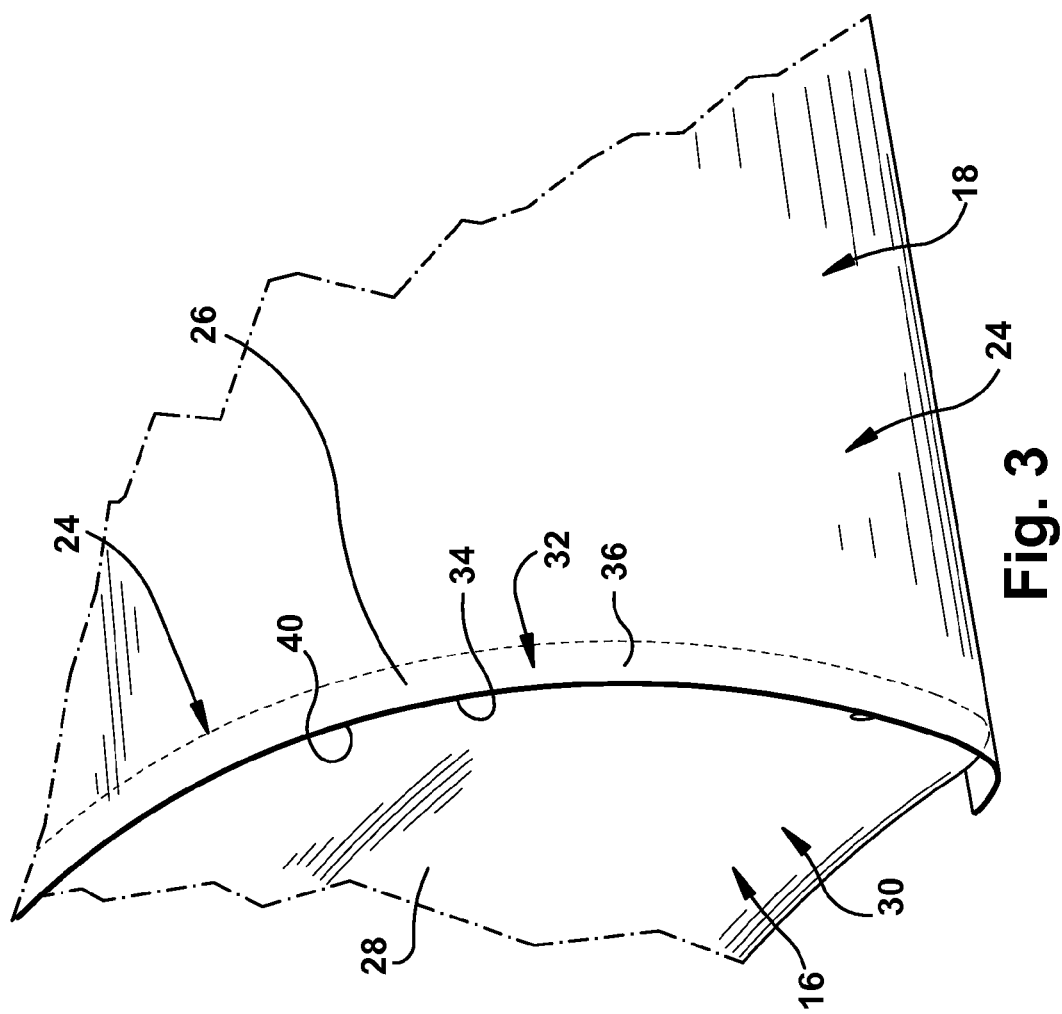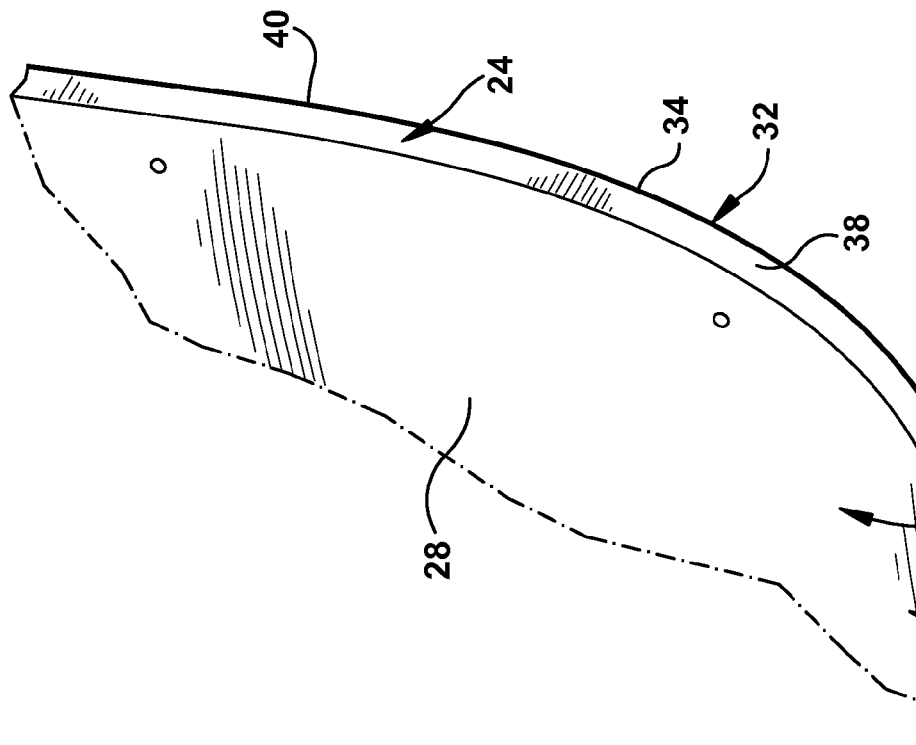

SPLASH GUARD ATTACHMENT CLIP ASSEMBLY

TECHNICAL FIELD

The present disclosure relates to an attachment clip assembly and, more specifically, to an attachment clip assembly for installation of vehicle splash guard to a projecting edge portion of a vehicle panel wherein the projecting edge portion extends in a direction generally parallel to a centerline of a vehicle.

BACKGROUND

Splash guards are generally mounted behind the front and/or rear wheels of a vehicle. Traditionally, splash guards were mounted to a vehicle panel or structure forming part of the wheel opening, such as, for example, a vehicle fender. The wheel opening defined by a vehicle fender typically included a flanged lip or rolled edge that generally extended from an exterior or outer surface of the fender in a direction toward the centerline of the vehicle. A lower portion of the flanged lip provided a natural mounting surface for the splash guard. That is, the flanged lip or rolled edge of the fender provided a curved, planar splash guard mounting surface. A planar mounting region of the splash guard was placed against the flanged lip or rolled edge such that the planar mounting region of the splash guard abutted the curved, planar mounting surface defined by the flanged lip of the fender. The flanged lip of the fender thereby provided a curved planar mounting surface that was substantially parallel to the planar mounting region of the splash guard, that is, when the splash guard was positioned against the flanged lip for installation, a general extent of the curved, planar flanged lip defining the fender mounting surface was generally parallel to the planar mounting region of the rear splash guard. The splash guard was typically affixed to the flanged lip by a plurality of threaded fasteners.

Today, many vehicles designs are based on so-called global vehicle platforms. A global vehicle platform typically refers to use of a single vehicle platform as the base or platform for the manufacturing of a number of vehicle models which varying interior and exterior designs, engine/power train options, etc. Typically, the global vehicle platform includes a common underbody, frame and suspension components. The global vehicle platform concept allows for manufacturing efficiencies and standardization resulting from producing a single, high volume platform that may be utilized across multiple vehicle models and even shared by multiple cooperating manufacturers. At the same time, a global vehicle platform advantageously supports a variety of exterior/interior design options and engine/drive train choices so that vehicles may be customized for particular countries or regions that the vehicles will be marketed to.

One issue that arises with the increasing use of global vehicle platforms involves vehicle standards. Specifically, different countries or regions may mandate different vehicle standards that have to be met for any vehicle sold into that country or region in terms of safety, emissions, ability to recycle vehicle components, etc. For a vehicle sold, for example, into the European market, certain European automotive standards have to be met. Thus, if a particular vehicle is planned to be sold into the European market, all vehicles produced on the single vehicle platform will generally be manufactured to conform to the European automotive standards, even if a substantial portion or majority of the vehicles will be sold, for example, in the United States. As such, many current vehicle models sold in the U.S. market today, which conform to certain European and/or other automotive standards, have a rear bumper fascia that extends forwardly from the rear of the vehicle and forms a lower portion of the vehicle wheel well opening. The rear bumper fascia, thus, comprises a vehicle panel that defines the mounting structure or mounting region for mounting of rear wheel splash guards.

In an increasing number of vehicles, the mounting region or surface presented by such a rear bumper fascia is markedly different than the flanged lip or rolled edge of the vehicle fender defining the wheel well opening, as discussed above. Specifically, a forward edge portion of the rear bumper fascia projects forwardly, in a direction generally parallel to a centerline of the vehicle, without an inwardly extending flanged lip or rolled edge. In such vehicles, the wheel well molding, which defines an interior of the wheel well, is typically recessed or set back from the forward edge portion of the rear bumper fascia. Thus, the mounting region or mounting surface presented for mounting of a rear wheel splash guard is a projecting edge of a vehicle panel, namely, a forward edge portion of the rear bumper fascia wherein the projecting edge extends in a direction generally parallel to a center line of the vehicle. The projecting edge defined by the forward edge portion of the rear bumper fascia does not include any type of flanged lip providing a mounting surface that would be generally parallel to the mounting region of the rear wheel splash guard. Such a projecting edge mounting region or structure does not facilitate mounting a splash guard to the rear wheel well opening defined by the rear bumper fascia via a plurality of threaded fasteners.

SUMMARY

In one aspect, the present disclosure relates to an attachment clip assembly for securing a splash guard to a projecting edge portion of a vehicle panel. In one exemplary embodiment, the attachment clip assembly comprises: an inner clip including a central portion, a gripping arm on one side of the central portion and a wedging arm on the opposite side of the central portion, the gripping arm extending in a direction transverse to the central portion and the wedging arm extending at an angle from the central portion, the central portion including an opening; an outer clip, including a central portion, a support arm on one side of the central portion and a wedging arm on the opposite side of the central portion, the support arm extending in a direction transverse to the central portion and the wedging arm being angled outwardly from the central portion, the central portion including a slotted opening extending in a direction between the support arm and the wedging arm, the inner clip fitting in nested relationship in the outer clip; a fastener extending through the opening of the inner clip and the slotted opening of the outer clip; and one of the wedging arms of the inner and outer clips including a guide interfitting with the other of the wedging arms of the inner and outer clips such that, upon tightening the fastener, the wedging arm of the inner clip slides along the wedging arm of the outer clip in a direction toward the central portion of the outer clip thereby moving the gripping arm of the inner clip in the direction of the support arm of the outer clip.

In another aspect, the present disclosure relates to a combination of a vehicle splash guard and an attachment clip assembly for securing the splash guard to a projecting edge portion of a vehicle panel. In one exemplary embodiment, the combination comprises: the splash guard including a mounting region; and the attachment clip assembly including: an inner clip including a central portion, a gripping arm on one side of the central portion and a wedging arm on the opposite side of the central portion, the gripping arm extending in a direction transverse to the central portion and the wedging arm extending at an angle from the central portion, the central portion including an opening; an outer clip, including a central portion, a support arm on one side of the central portion and a wedging arm on the opposite side of the central portion, the support arm extending in a direction transverse to the central portion and the wedging arm being angled outwardly from the central portion, the central portion including a slotted opening extending in a direction between the support arm and the wedging arm, the inner clip fitting in nested relationship in the outer clip; a fastener extending through the opening of the inner clip and the slotted opening of the outer clip and further extending into the mounting region of the splash guard; and one of the wedging arms of the inner and outer clips including a guide interfitting with the other of the wedging arms of the inner and outer clips such that, upon tightening the fastener, the wedging arm of the inner clip slides along the wedging arm of the outer clip in a direction toward the central portion of the outer clip thereby moving the gripping arm of the inner clip in the direction of the support arm of the outer clip.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 2 is a schematic perspective view of a portion of the rear wheel well opening of the vehicle of FIG. 1 showing the forward projecting edge portion of the rear bumper fascia and a recessed wheel well molding, as seen from inside the vehicle in the region of the rear tire;

FIG. 3 is a schematic perspective view of the portion of the rear wheel well opening of FIG. 2, as seen from outside the vehicle;

DETAILED DESCRIPTION

The present disclosure relates to an attachment clip assembly for attaching a vehicle accessory, such as a splash guard, to a body panel of a vehicle wherein a splash guard mounting region or mounting surface of the body panel constitutes a projecting edge portion that is substantially parallel to a centerline of the vehicle. The attachment clip assembly of the present disclosure utilizes a wedging and fastener structure to simultaneously secure the attachment clip assembly to the projecting edge portion of the vehicle body panel and also secure the splashguard to a splash guard mounting surface of the attachment clip assembly wherein the splash guard mounting surface is substantially orthogonal to the projecting edge portion of the vehicle panel and substantially orthogonal to the center line of the vehicle. The attachment clip assembly utilizes an inner clip that is nested in an outer clip and a fastener that extends through both clips. As the fastener is tightened, spaced apart arms of the inner and outer clips move together to capture the projecting edge portion of the body panel between the two arms to secure the attachment clip assembly to the projecting edge portion of the body panel. At the same time, as the fastener is tightened, a mounting region splash guard is captured and squeezed between a head of the fastener and a splash guard mounting surface of the attachment clip assembly to secure the splash guard to the attachment clip assembly and thereby firmly couple the splash guard to the projecting edge portion of the vehicle body panel. The attachment clip assembly of the present disclosure may advantageously be using in conjunction with vehicles whose splash guard mounting regions or mounting surface comprises a projecting edge portion that has no appreciable flanged lip or rolled edge extending inwardly toward the vehicle center line or whose splash guard mounting regions comprise a projecting edge portion that has a flange lip, but a width of the flange lip is too narrow for a standard splash guard mounting clip, e.g., a width that is less than 10 mm.

Figure 1:
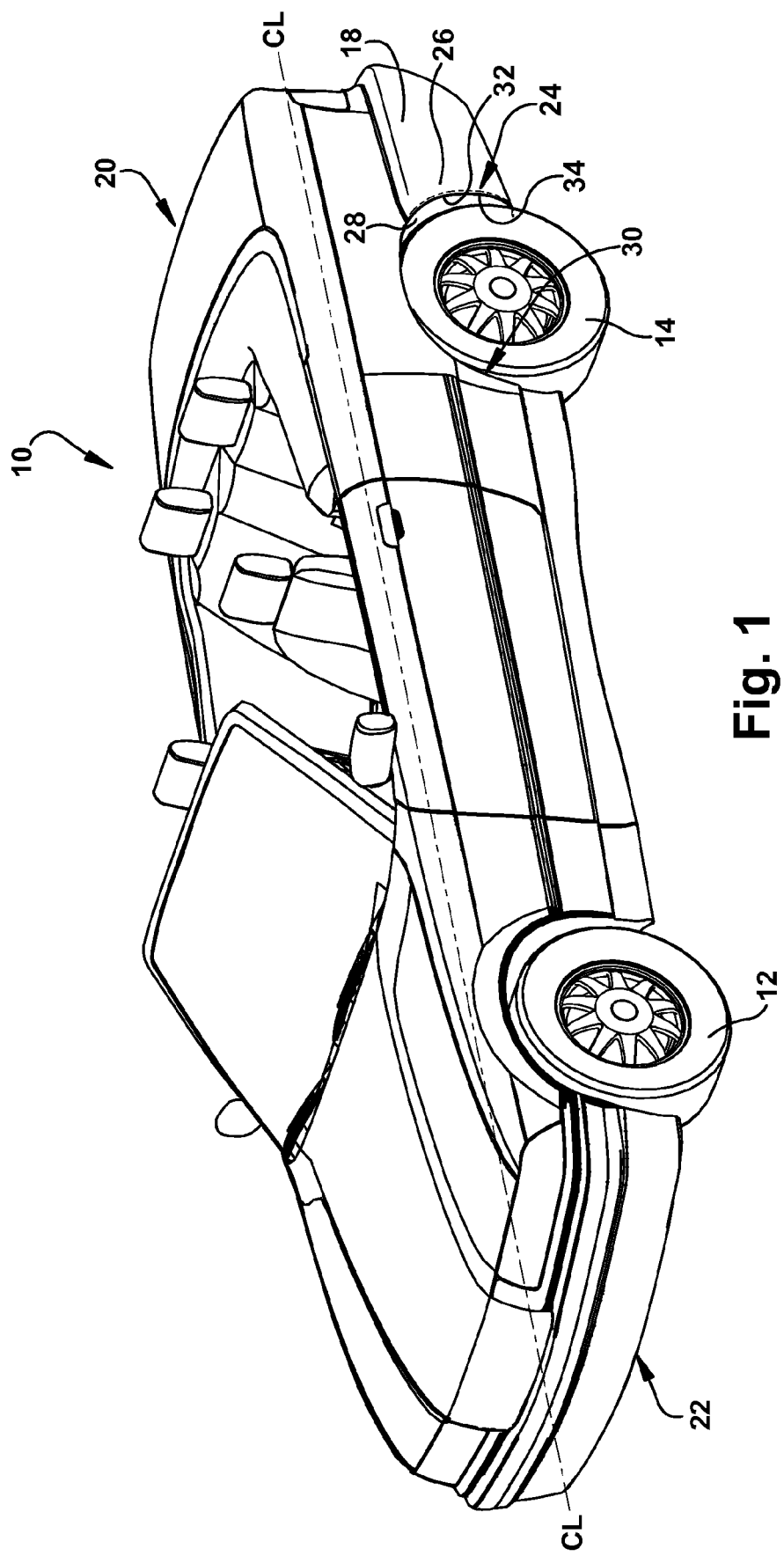
FIG. 1 is a schematic perspective view of a vehicle having a rear bumper fascia forming part of a rear wheel well opening of the vehicle wherein the rear bumper fascia defines a forward projecting edge portion that defines a mounting surface for a rear wheel splash guard.

Turning to the drawings, FIGS. 1-3 schematically depict a vehicle 10 having a vehicle centerline CL and front and rear wheels 12, 14. The rear wheel 14 is partially surrounded by a rear wheel well 16. A portion of the rear wheel well 16 is defined by a rear bumper fascia 18 that wraps around a rear end 20 of the vehicle 10 (typically defined by a rear bumper—not shown) and extends in a forward direction F toward a front end 22 of the vehicle 10. A portion of a rear wheel well 16 is defined by a forward, peripheral portion 24 of the rear bumper fascia 18.

As can best be seen in FIGS. 2 and 3, the forward, peripheral portion 24 of the rear bumper fascia 18 defines an outer surface 26 of the rear wheel well 16, while a rear wheel well molding 28 defines an interior region 30 of the rear wheel well 16. The wheel well molding 28 is recessed or set back from a forward projecting edge portion 32 of the rear wheel well 16 that is defined by the forward peripheral portion 24 of the rear bumper fascia 18. For purposes of mounting a splash guard 50 to the rear wheel well 16, a mounting surface or region 34 presented to the installer of a rear wheel splash guard 50 is the forward projecting edge portion 32 of the rear wheel well 16. The forward peripheral portion 24 defining the forward projecting edge portion 32 is generally parallel to the centerline CL of the vehicle 10.

Advantageously, an attachment clip assembly 100 of the present disclosure is adapted to mount an accessory, such as the splash guard 50, to an edge portion, such as the forward projecting edge portion 32, of a vehicle panel 18. In one exemplary embodiment, the attachment clip assembly 100 includes an inner clip 110, an outer clip 130, and a fastener 150. As can best be seen in FIGS. 4-8, the inner clip 110 is generally Z-shaped and includes a central planar portion 112, a gripping arm 114 extending substantially orthogonally to the central planar portion 112, and a wedging arm 116 extending at an acute angle α from the central planar portion 112 in a direction opposite to a direction of the gripping arm 114. That is, looking at FIG. 7, the gripping arm 114 extends generally in an upward direction UP, while the wedging arm 116 extends generally in a downward direction DW. In one exemplary embodiment, the acute angle α (FIG. 7) of the wedging arm 116 with respect to a plane P1 defined by the central planar portion 112 of the inner clip 110 is approximately 15 degrees. As can best be seen in FIGS. 7 and 8, the wedging arm 116 includes a scaled or saw-tooth outer surface 117.

Figure 4:
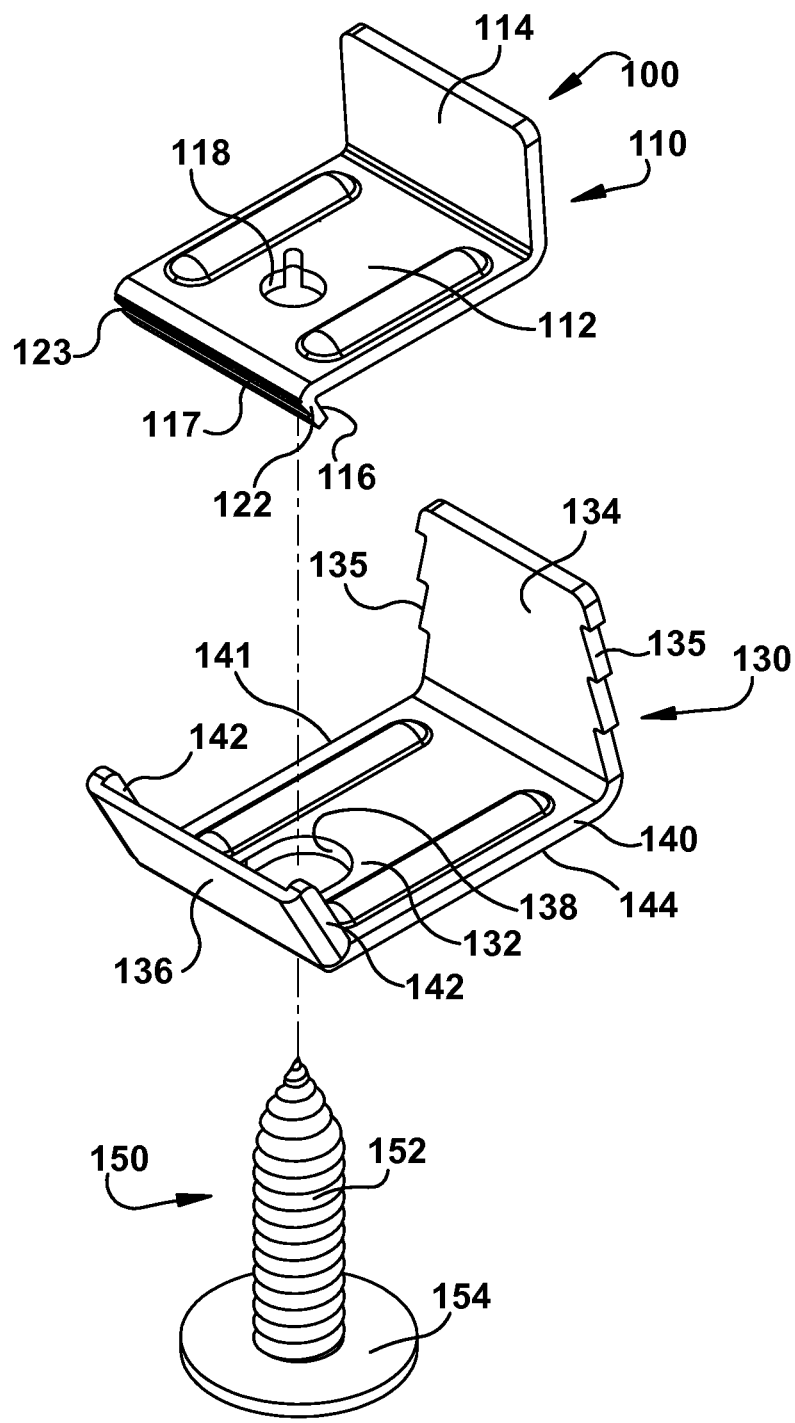
FIG. 4 is a schematic exploded perspective view of a first exemplary embodiment of an attachment clip assembly of the present disclosure, showing an inner clip, an outer clip; and a fastener.

The central planar portion 112 of the inner clip 110, as best seen in FIG. 4, includes a generally circular opening 118 for snugly receiving the fastener 150. In one exemplary embodiment, the fastener 150 is a threaded fastener having a threaded generally cylindrical body 152 and an enlarged head 154 and the circular opening 118 of the central planar portion 112 is a threaded opening which threadedly receives the fastener body 152. The circular opening 118 comprises a standard thread form that matches the characteristics of the threaded fastener 150. As would be understood by one of ordinary skill in the art, differing thread forms and threaded fastener configurations could be used. In one exemplary embodiment, the thread form of the opening 118 is a single helical thread.

Figure 7:
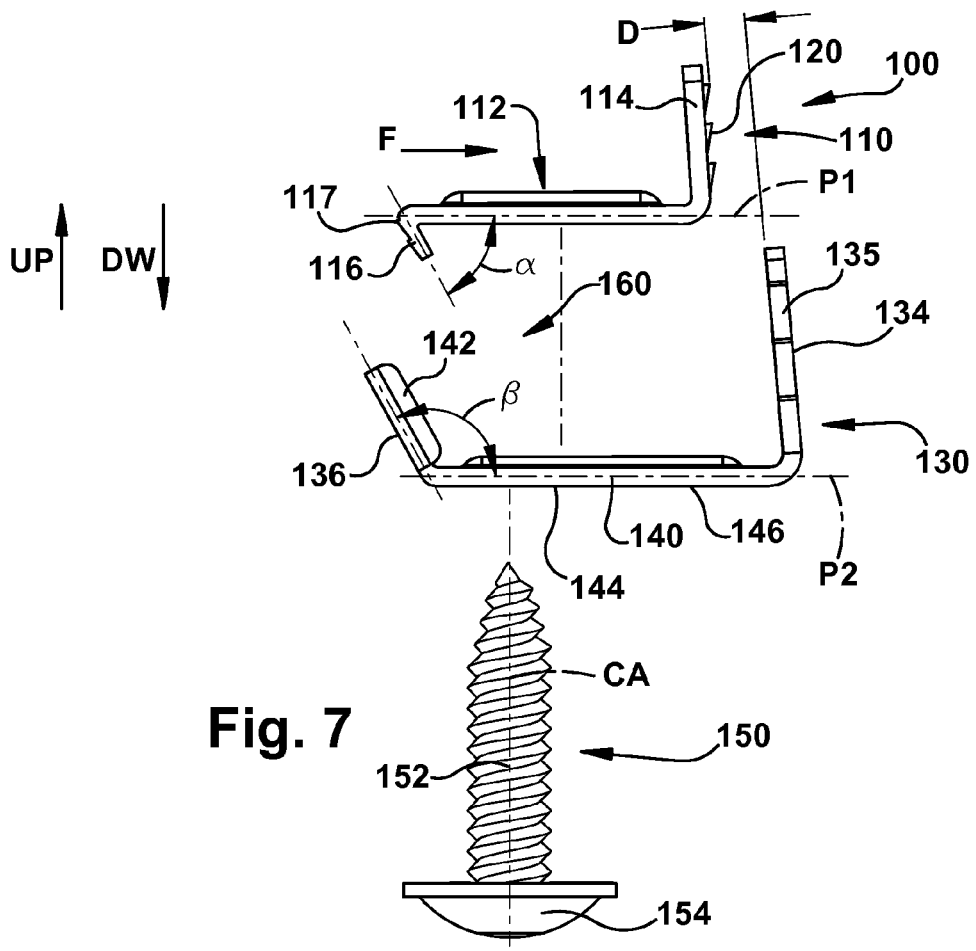
FIG. 7 is a schematic exploded side elevation view of the attachment clip assembly of FIG. 4.
Figure 8:
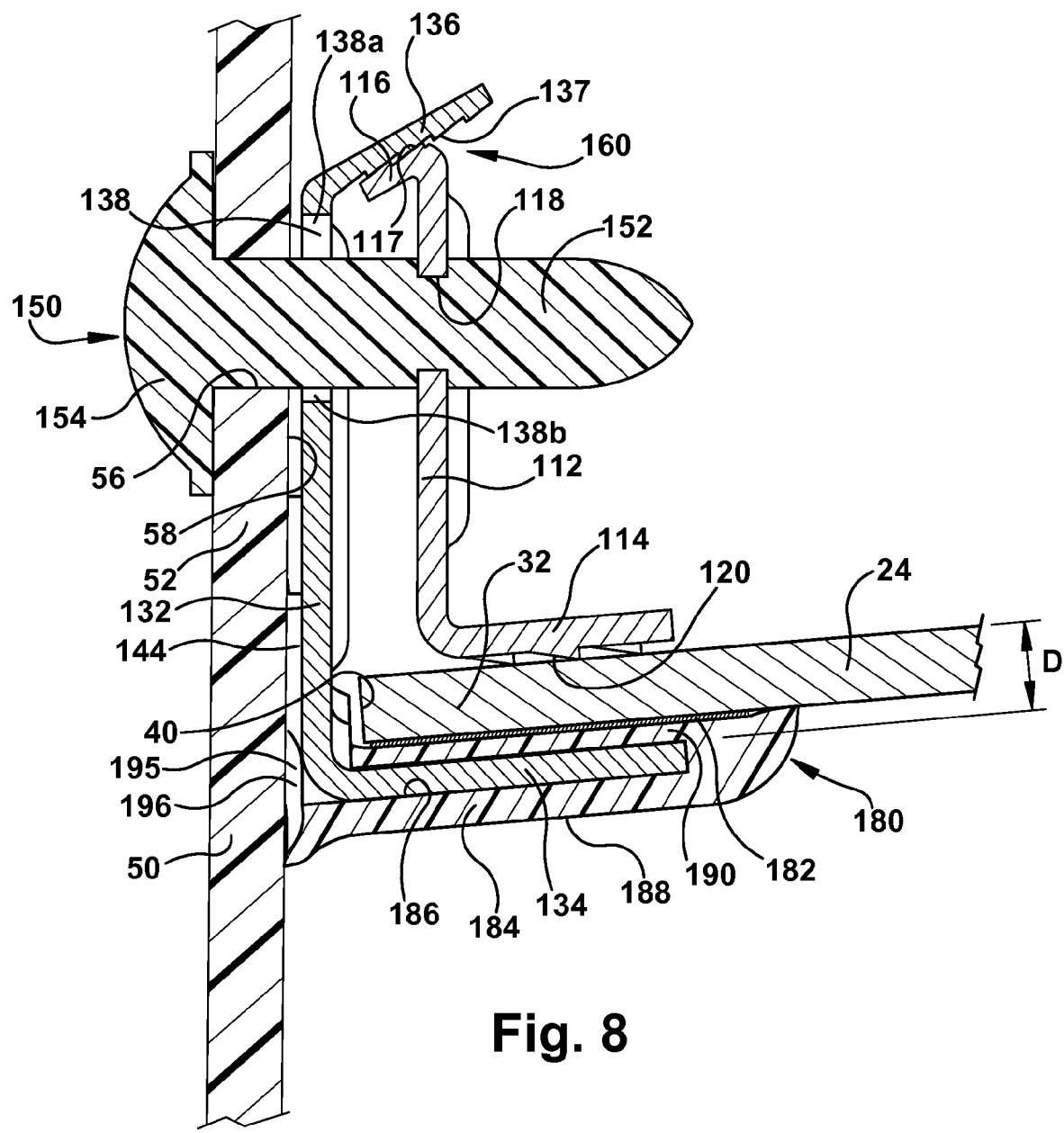
FIG. 8 is a schematic sectional view of the attachment clip assembly of FIG. 4 in a fastened condition, the splash guard clip assembly being mounted to the projecting edge portion of the rear vehicle fascia of the vehicle and a splash guard being mounted to the splash guard clip assembly.

The gripping arm 114 includes a scaled or saw-tooth outer surface 120 for secure gripping of the forward projecting edge 32 of the vehicle panel 18 when the attachment clip assembly 110 is changed by tightening the threaded fastener 150 from a loosened or unfastened condition (FIG. 7) to a fastened condition (FIG. 8). The circular opening 118 of the inner clip 110 and the threaded fastener 150 define a central axis CA (FIG. 7) extending through a center of the opening 118 and the fastener 150. The central axis CA is substantially orthogonal to the plane P1 defined by the central planar portion 112 of the inner clip 110.

The outer clip 130 includes a central planar portion 132, a support arm 134 extending substantially orthogonally to the central planar portion 132, and a wedging arm 136 extending at an acute angle 13 from the central planar portion 132. In one exemplary embodiment, the acute angle 13 (FIG. 7) of the wedging arm 136 with respect to a plane P2 defined by the central planar portion 132 of the outer clip 130 is approximately 15 degrees. The plane P2 is substantially orthogonal to the central axis CA defined by the circular opening 118 of the inner clip 110 and the fastener 150. An inner or upper surface 137 of the wedging arm 136 has a scaled or saw-tooth configuration. In one exemplary embodiment, the support arm 134 is canted or angled slightly inwardly about 5 degrees with respect to the central planar portion 132. The slight inward canting of the support arm 134 results in a mounting surface 146 defined by an exterior wall 144 of the central planar portion 132 to be better "trued up", that is, more orthogonal with respect to the vehicle center line CL. In one exemplary embodiment, the gripping arm 114 of the inner clip 110 may be similarly inwardly canted to match the inward canting of the support arm 134 of the outer clip 130.

Figure 5:
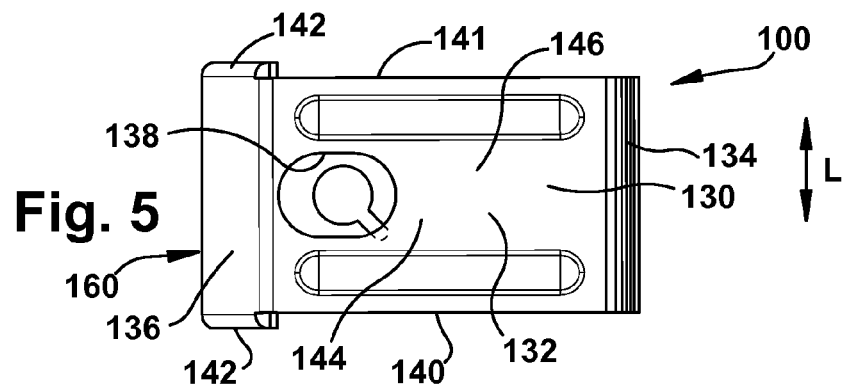
FIG. 5 is a schematic bottom plan view of the attachment clip assembly of FIG. 4 with the in a loosened or unfastened condition, with the fastener removed for clarity.
Figure 6:
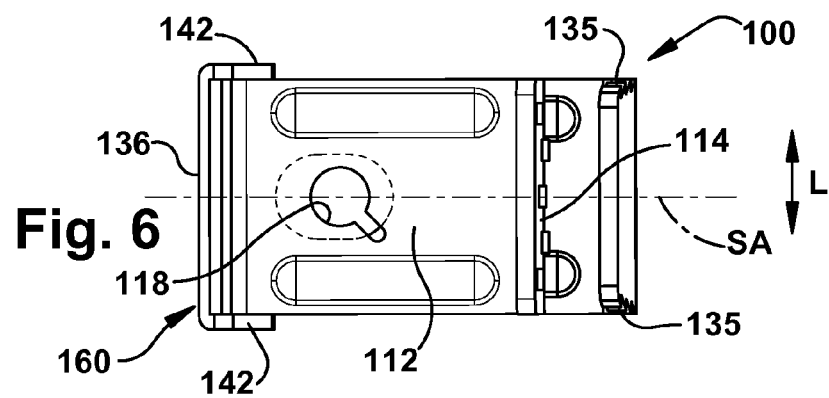
FIG. 6 is a schematic top plan view of the attachment clip assembly of FIG. 4, with the fastener removed for clarity.

The central planar portion 132 of the outer clip 130, as best seen in FIG. 4, includes a slotted opening 138 for receiving the fastener 150. The slotted opening 138 is aligned with the central axis CA through the circular opening 118 of the inner clip 110 and the fastener 150. The inner and outer clips 110, 130 are configured and sized such that the inner clip 110, as best seen in FIGS. 5, 6 and 8, is received by the outer clip 130 in a nested relationship. The inner and outer clips 110, 130 are further configured such that, as the fastener 150 is tightened and the attachment clip assembly 110 is moved from the unfastened condition (FIG. 7) to the fastened condition (FIG. 8), the wedging arm 116 of the inner clip 110 slides downwardly along the wedging arm 136 of the outer clip 130, generally, simultaneously in a downward direction DW and a forward direction FW, as shown in FIG. 7. This causes a distance D (FIGS. 7 and 8) between the gripping arm 114 of the inner clip 110 and the support arm 134 of the outer clip 130 to decrease to a sufficient extent such that the forward projecting edge 32 of the rear bumper fascia 18 is firmly secured between the gripping and support arms 114, 134. The dimensions of the inner and outer clips 110, 130 will depend, among other things, on the desired values the distance D and the desired change in distance D as the attachment clip assembly 100 moves from the unfastened condition (FIGS. 6 and 7) to the fastened condition (FIG. 8).

The inner and outer clips 100, 130 and the fastener 150 may be fabricated of a variety of materials, including metals and plastics, that exhibit strength, durability and corrosion-resistance so that the attachment clip assembly 100 may withstand forces applied to the attachment clip assembly due to vehicle speed and vibration and impact by road debris, as well as being able to withstand exposure to vehicle fluids and road treatment chemicals such as salt.

As the wedging arm 116 of the inner clip 110 slides down the wedging arm 136 of the outer clip 130 (as the fastener 150 is tightened), the circular opening 118 of the central planar portion 112 of the inner clip 110 moves forwardly (in the forward direction F—FIG. 7) with respect to the slotted opening 138 of the central planar portion 132 of the outer clip 130.

The extent of the lateral movement of the circular opening 118 with respect to the slotted opening 138 will depend on the specific configuration of the attachment clip assembly 100, however, generally it is preferred that, as the attachment clip assembly 100 is tightened or moved from the unfastened condition to the fastened condition, the circular opening 110 will move substantially across the slotted opening 138 from a first end region 138a (FIG. 8) of the slotted opening 138 closer to the wedging arm 136 to a second end region 138b of the slotted opening closer to the support arm 134.

The interfitting of the scaled or saw-tooth inner surface 137 of the wedging arm 136 of the outer clip 130 and the scaled or saw-tooth outer surface 117 of the wedging arm 116 of the inner clip 110 advantageously provides a ratcheting action. That is, the ratcheting action prevents movement of the inner clip 110 in an upward direction UP (FIG. 7) with respect to the outer clip 130, but, facilitates movement of the inner clip 100 in the downward direction DW is facilitated. Additionally, the ratcheting action provides an audible "clicking" as the inner clip 110 moves in the downward direction DW with respect to the outer clip 130. Using the ratcheting action between the inner and outer clips 110, 130, the attachment clip assembly 100 may be preliminary mounted or affixed to the forward projecting edge 32 of the wheel well 16 by hand and will maintain its position on the projecting edge 32. Then, the splash guard 50 and fastener 150 may be conveniently aligned with the aligned openings 118, 138 of the inner and outer clips. As the fastener 150 is threaded into the aligned openings 118, 138 and is tightened, the inner clip 110 moves an additional amount in the downward direction DW to further tighten the gripping arm 114 of the inner clip 110 and the support arm 134 to the forward projecting edge 32 of the wheel well 16. At the same time, as the fastener 150 is tightened, the splash guard 50 is affixed to the splash guard mounting surface 146 defined by the central portion 132 of the outer clip 130. Depending on the specific nature of the fastener 150, under some circumstances the entire installation process may be accomplished by hand. Additionally and advantageously, no drilling of holes in the vehicle 10 is required with the attachment clip assembly 100 of the present disclosure.

In one exemplary embodiment, the attachment clip assembly 100 of the present disclosure includes a guide structure or configuration 160 (FIG. 8) that guides the movement of the inner clip 110 with respect to the outer clip 130 as the wedging arm 116 of the inner clip 110 slides down the wedging arm 136 of the outer clip 130 as the fastener 150 is tightened and maintains the inner clip 110 in its nested relationship with the outer clip 130. The guide 160, in one exemplary embodiment, includes a pair of shoulders 142 of the outer clip 130 that extend upwardly from the wedging arm 136. The pair of shoulders 142 guide or contact front and back edges 122, 123 of the wedging arm 116 of the inner clip 110 and thereby guide and constrain movement of the inner clip 110 relative to the outer clip 130. That is, as the wedging arm 116 of the inner clip 110 slides down the wedging arm 136 of the outer clip, the pair of shoulders 142 prevent relative sideways movement of the inner clip 110 with respect to the outer clip 130, that is, in a lateral direction L, as shown in FIGS. 5 and 6. One of skill in the art would recognize that many options exist for guiding or constraining relative movement between the inner and outer clips 110, 130, for example, the pair of shoulders 142 could be formed as part of the inner clip 110, a rod & slot guide between the inner and outer clips 110, 130 could be employed, etc.

The guide 160 of the attachment clip assembly 110 also includes the fastener 150. The fastener 150 passes through the circular opening 118 of the inner clip 110 and the slotted opening 138 of the outer clip 130 thereby facilitating axial alignment of the circular opening 118 and the slotted opening 138. As the fastener 150 is tightened, the wedging arm 116 of the inner clip 110 slides down the wedging arm 136 of the outer clip 130, the circular opening 118 moves with respect to the slotted opening 138 in the forward direction F such that the distance D between the gripping arm 114 of the inner clip 110 and the support arm 134 of the outer clip 130 decreases. The fastener 150, which extends through both the openings 118, 138, helps to restrain relative movement of the inner and outer clips 110, 130 with respect to each other in the sideways or lateral direction L, that is, directions that are orthogonal to the slot axis SA. Of course, it should be recognized that the fastener 150, without the pair of shoulders 142, would be insufficient to prevent relative rotation of the inner clip 110 with respect to the outer clip 130 about the central axis CA.

Figure 9:
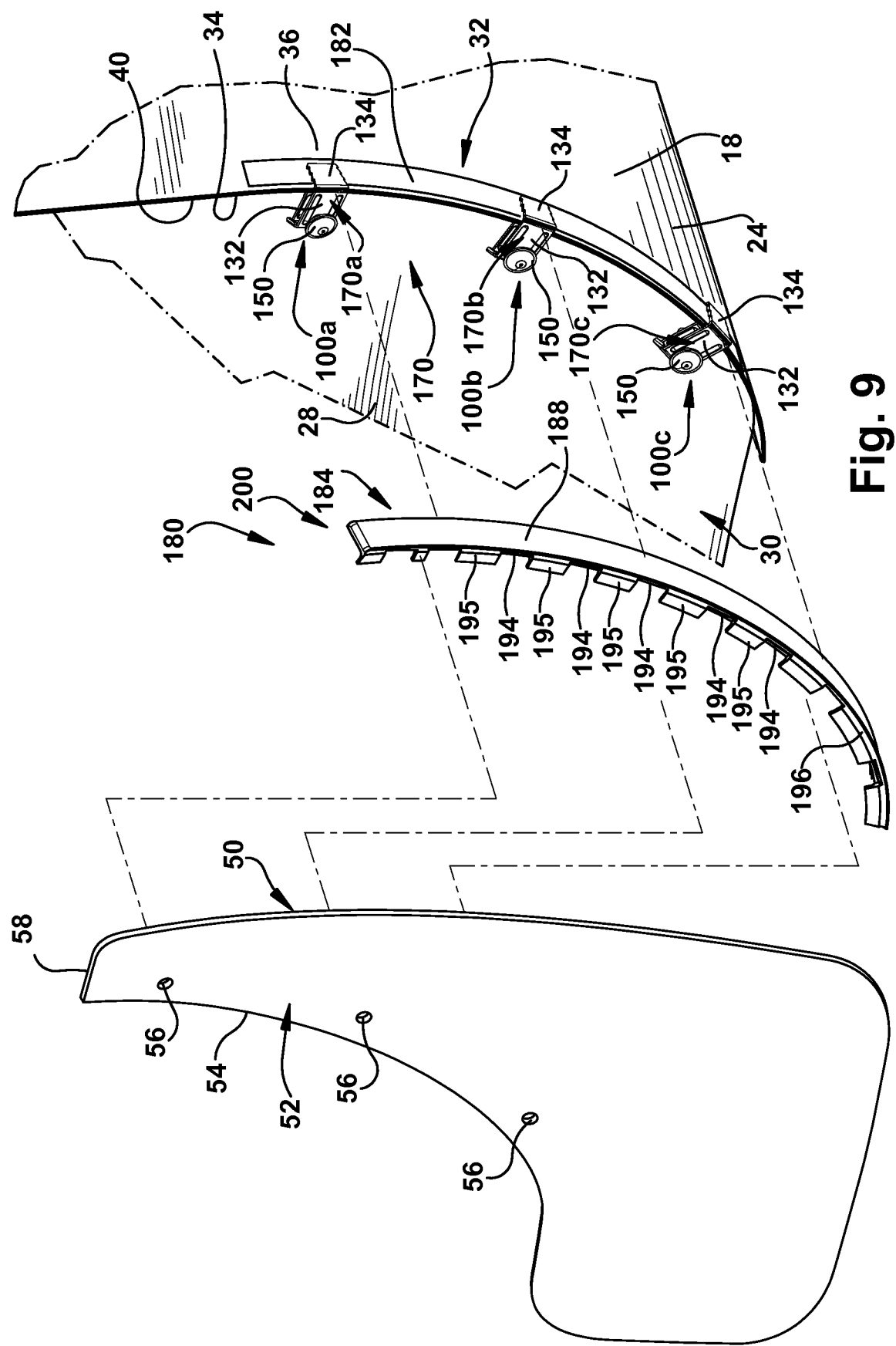
FIG. 9 is a schematic perspective view of a portion of the rear wheel well opening of the vehicle, as seen from an exterior of the vehicle, showing three attachment clip assemblies of the present disclosure mounted to the projecting edge portion of the rear wheel well opening and further showing a finishing strip assembly of the present disclosure including an adhesive strip and a finishing strip and a vehicle splash guard for mounting to the three attachment clip assemblies.
Figure 10:
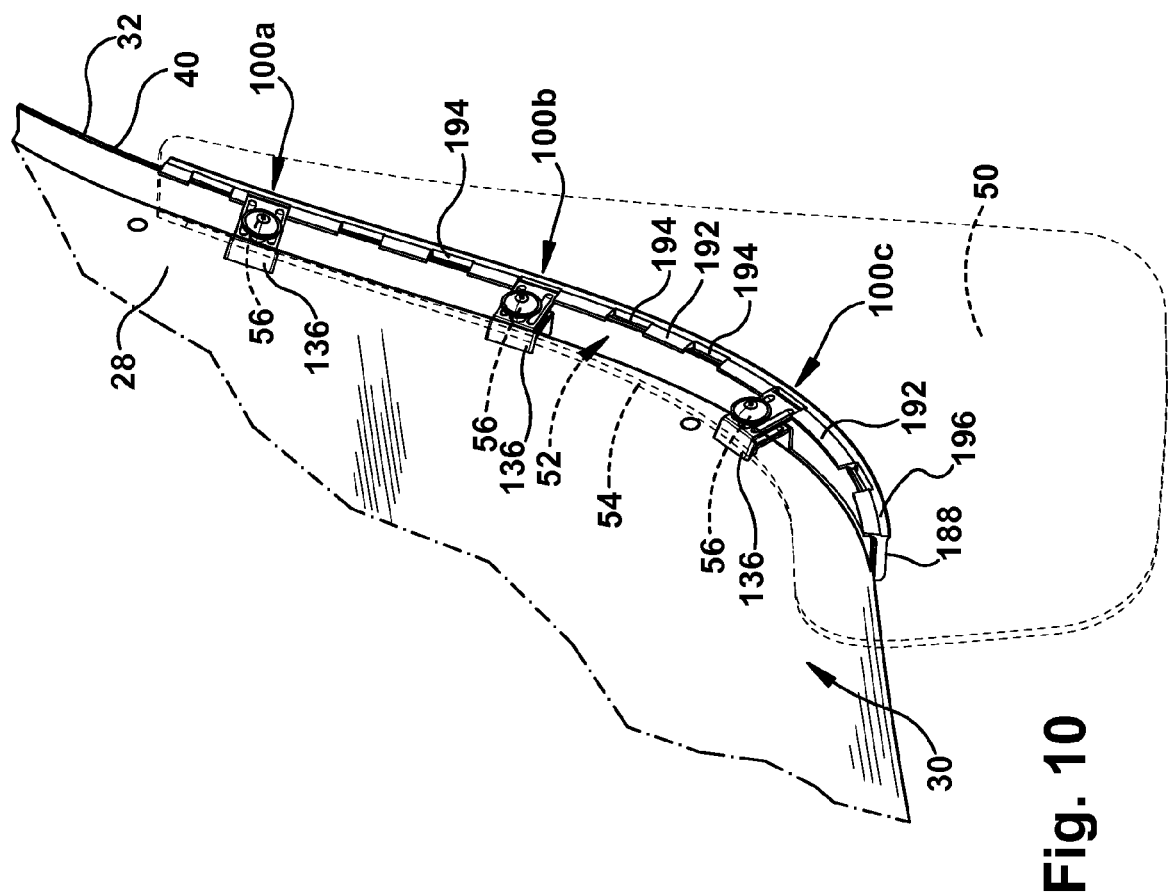
FIG. 10 is a schematic perspective view of a portion of the rear wheel well opening of the vehicle, as seen from an exterior of the vehicle, showing three attachment clip assemblies mounted to the projecting edge portion of the rear wheel well opening and further showing the finishing strip assembly affixed to the exterior of the projecting edge portion of the rear wheel well opening.
Figure 11:
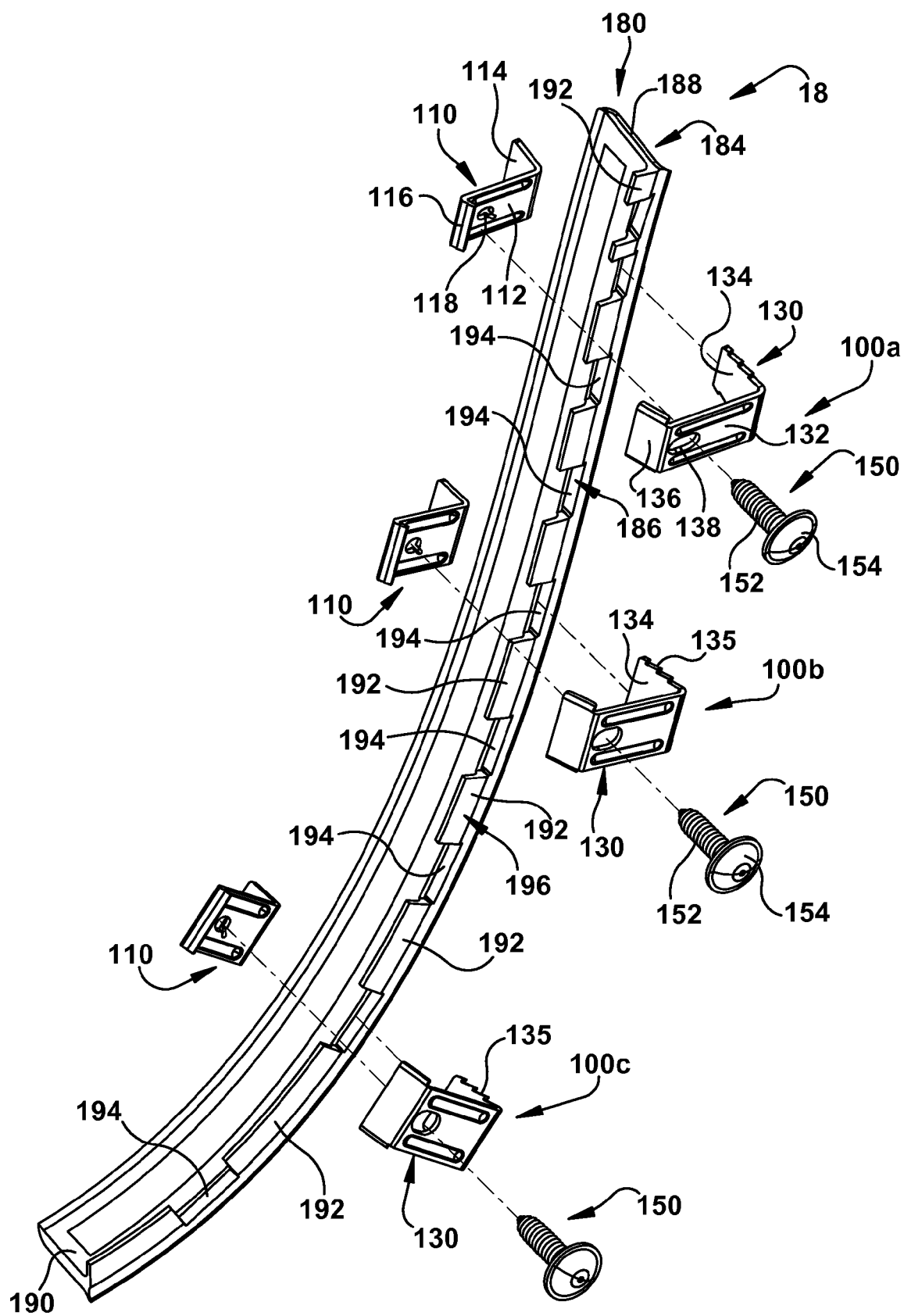
FIG. 11 is a schematic exploded perspective view showing three attachment clip assemblies and the finishing strip assembly including the adhesive strip and the finishing strip.
Figure 12:
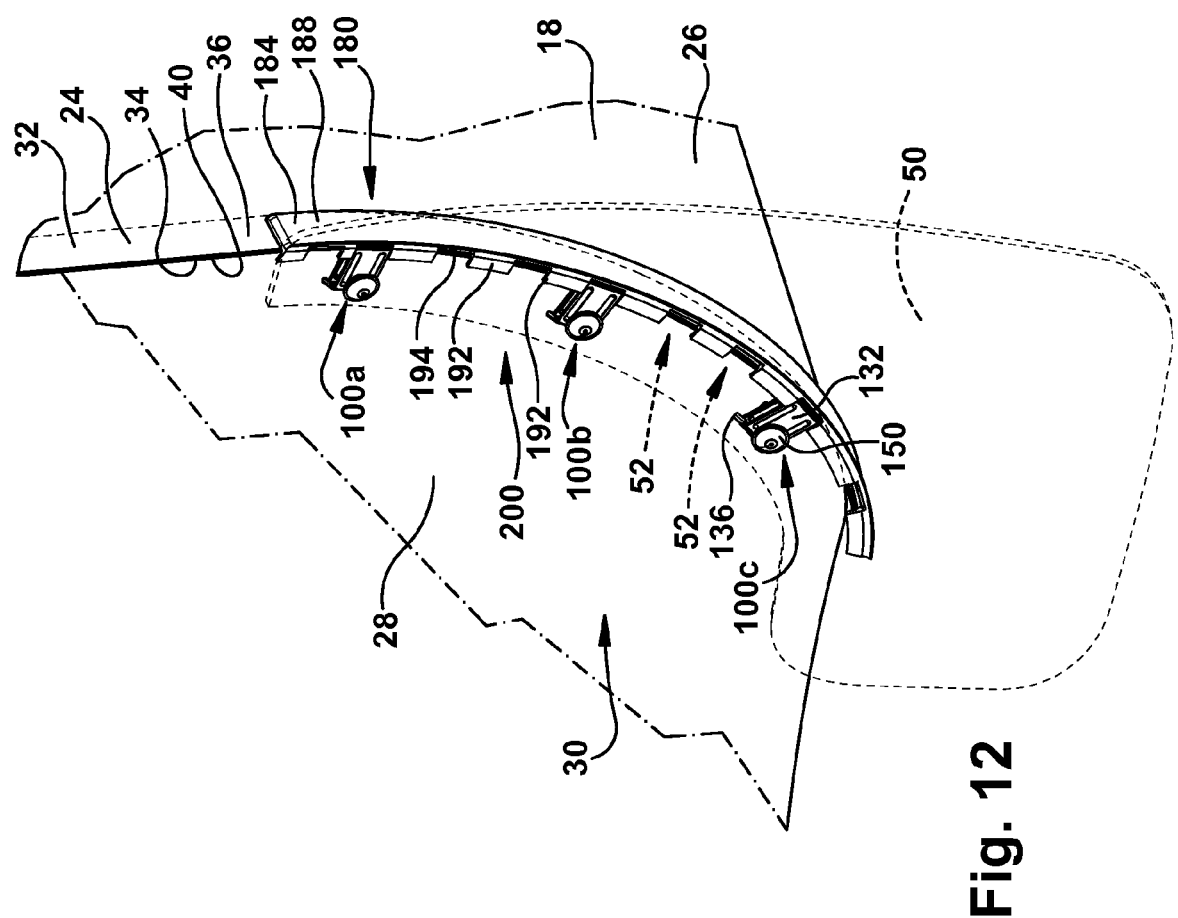
FIG. 12 is a schematic perspective view of a portion of the rear wheel well opening of the vehicle, as seen from a front exterior of the vehicle, showing three splash guard clip assemblies mounted to the projecting edge portion of the rear wheel well opening and further showing the finishing assembly cover assembly affixed to the exterior of the projecting edge portion of the rear wheel well opening.
Figure 14:
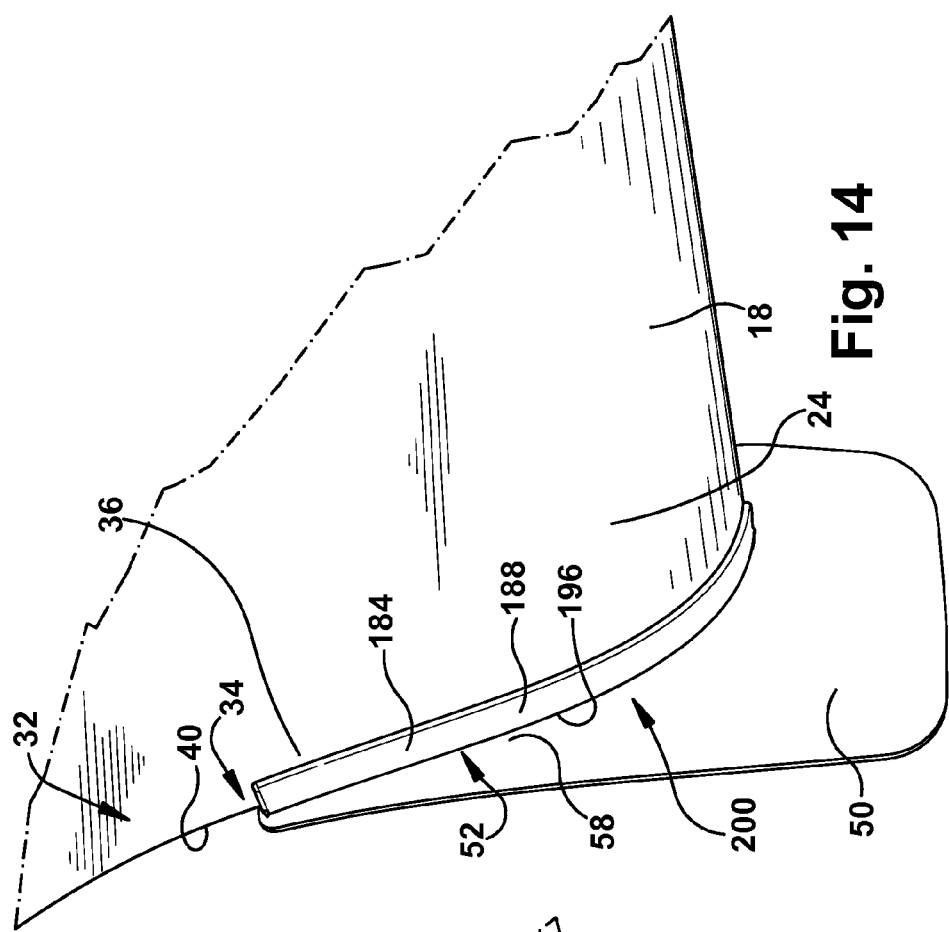
FIG. 14 is a schematic perspective view of a portion of the rear wheel well opening of the vehicle, as seen from an rear exterior of the vehicle, showing the final appearance of the splash guard, as mounted to the rear wheel well opening of the vehicle, schematically showing how the finishing strip assembly hides the respective support arms of the three splash guard clip assemblies.
Figure 13:
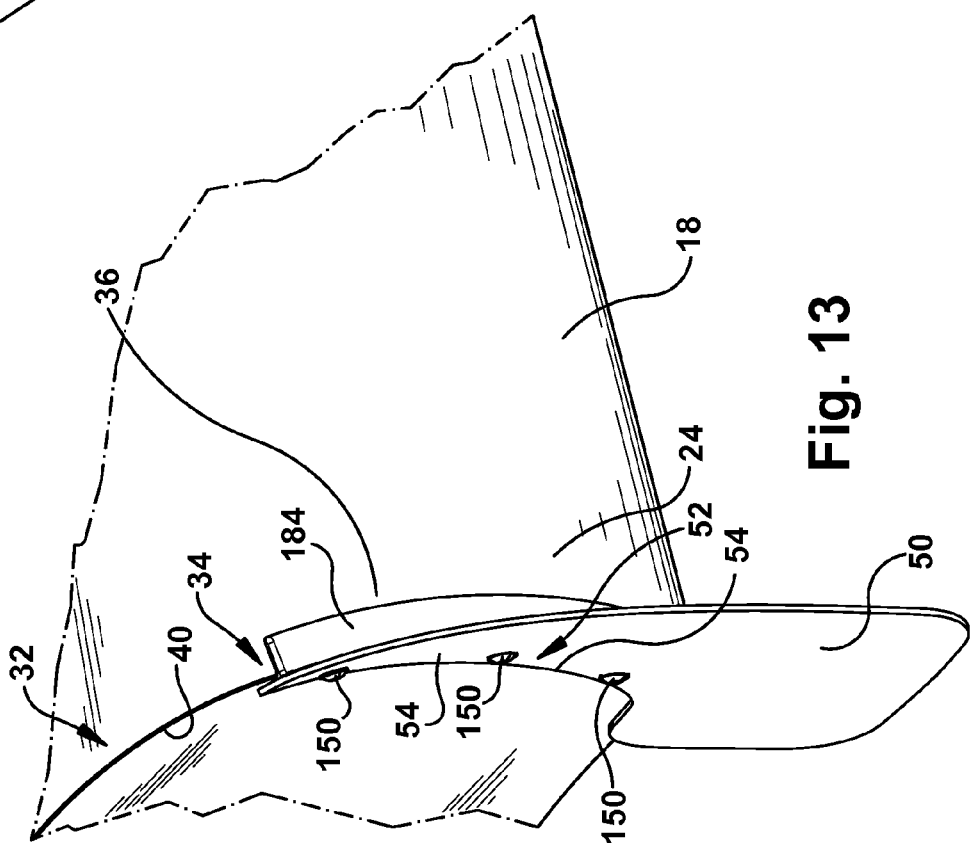
FIG. 13 is a schematic perspective view of a portion of the rear wheel well opening of the vehicle, as seen from a front exterior of the vehicle, showing a final appearance of the splash guard, as mounted to the rear wheel well opening of the vehicle, schematically showing how the finishing strip assembly hides the respective support arms of the three splash guard clip assemblies used to mount the splash guard to the projecting edge portion of the rear wheel well opening.

The splash guard 50 includes a generally planar mounting region 52 defined in a curved peripheral portion 54 of the splash guard 50. The splash guard mounting region 52 is shaped to conform to the curvature of the forward projecting edge portion 32 of the rear wheel well 16 that defines the vehicle mounting region or surface 34 of the vehicle panel 18 that the splash guard 50 will be mounted to. Stated another way, the splash guard mounting region 52 of the splash guard 50 is configured to conform to the vehicle mounting surface 34 of the vehicle 10 wherein the vehicle mounting surface 34 extends generally parallel to the center line CL of the vehicle 10. As can be seen in FIGS. 9-10, a plurality of attachment clip assemblies 100a, 100b, 100c, typically three, are used to affix the splash guard 50 to the vehicle mounting surface 34. Accordingly, the splash guard mounting region 52 will include three apertures 56, one for each of the three attachment clip assemblies 100a, 100b, 100c, sized to receive a respective fastener 150 of the attachment clip assemblies. When in an unfastened condition, the attachment clip assemblies 100a, 100b, 100c are positioned with respect to the splash guard 50 such that the fastener 50 extends through a respective one of the three apertures 56 of the splash guard mounting region 52.

For each of the attachment clip assemblies 100a, 100b, 100c, the fastener 150 is threaded through the aperture and through the aligned openings 118, 138 of the inner and outer clips 110, 130. This fixes the relative position of each of the three attachment clip assemblies 100a, 100b, and 100c with respect to the splash guard 50. An exterior wall 144 of the central planar portion 132 of the outer clip 130 functions as a mounting surface 146 for the splash guard 50, that is, a clip facing surface 58 of the splash guard mounting region 52 bears against the mounting or bearing surface 146 defined by the exterior wall 144. Collectively, the mounting surfaces 146 of the attachment clip assemblies 100a, 100b, and 100c define a collective splash guard mounting region 170 comprising three mounting regions 170a, 170b, 170c (FIG. 9) defined by the three respective attachment clip assemblies 100a, 100b, 100c. The collective mounting region 170 is substantially orthogonal to the forward projecting edge portion 32 of the wheel well 16. While the splash guard mounting region 170 defined by the three attachment clip assemblies 100a, 100b, 100c is discontinuous, the region 170 is akin to the splash guard mounting region defined by the flanged lip or rolled edge of prior vehicle wheel wells.

The splash guard 50 and the attachment clip assemblies 100a, 100b, 100c, still in the unfastened condition, are positioned with respect to the projecting edge portion 32 of the rear wheel well 16 such that, for each of the attachment clip assembles 100a, 100b, 100c, the support arm 134 of the outer clip 130 is positioned adjacent an exterior side 36 of the wheel well splash guard mounting surface 34 and the gripping arm 114 of the inner clip 110 is positioned adjacent an interior side 38 of the splash guard mounting surface 34. The attachment clip assemblies 100a, 100b, 100c are pushed against the splash guard mounting surface 34 such the central planar portion 132 of the outer clip 130 bottom out against a peripheral edge 40 of the splash guard mounting surface 34 (best seen in FIG. 8). The respective threaded fasteners 150 of the three attachment clip assemblies 100a, 100b, 100c are then tightened to move the attachment clip assemblies from the unfastened condition (FIG. 7) to the fastened condition (FIG. 8) and thereby both: 1) capturing the splash guard mounting region 52 between the head 154 of the fastener 150 and the mounting surface 146 defined by the exterior wall 144 of the central planar portion 132 of the outer clip 130; and 2) capturing the vehicle mounting surface 34 defined by the forward projecting edge portion 32 of the rear wheel well 16 between the gripping arm 114 of the inner clip 110 and the support arm 134 of the outer clip 130. Thus, by tightening the threaded fasteners 150 of the attachment clip assemblies 100a, 100b, 100c, the attachment clip assemblies are moved from the unfastened condition to the fastened condition and the splash guard 50 is securely fixed to the vehicle rear bumper fascia or panel 18.

As can be seen in FIG. 10, when the three attachment clip assemblies 100a, 100b, 100c are affixed to the vehicle mounting surface 34, the support arm 134 of the outer clip 130 is visible from an exterior of the vehicle 10. Optionally, for esthetic purposes, it may be preferable to "hide" the support arms 134 so that they are not visible from the vehicle exterior. To this end, the attachment clip assembly 100 of the present disclosure may include, as is seen in FIGS. 9-14, a finishing strip assembly 180 comprising a strip of double sided adhesive tape 182 and a cover or finishing strip 182. As can best be seen in FIGS. 8 and 9, the double sided adhesive strip 182 is applied to the exterior side 36 of the vehicle mounting surface 34 adjacent and along the forward peripheral edge 40 of the vehicle mounting surface 34. After the double sided adhesive tape 182 is attached to the vehicle mounting surface 34, the finishing strip 184 is applied to the double sided adhesive tape 182 (FIG. 10).

As can best be seen in FIG. 8, the finishing strip 184 includes a pocket 186 defined between an exterior or outer wall 188 and an interior or inner wall 190. The pocket 186 that extends the length of the strip 184. As best seen in FIG. 8, when the attachment clip assembly 100 is positioned on the vehicle mounting surface 34, the support arm 134 of the outer clip 130 is inserted in the finishing strip pocket 186. In this way, the support arm 134 of the outer clip 130 does not bear directly against the exterior side 36 of the vehicle mounting surface 34.

A series of notches 194 are cut into a rear facing wall 196 (FIG. 11) of the finishing strip 184 to facilitate entry of the support arms 134 of the outer clips 130 of the attachment clip assemblies 100a, 100b, 100c into the pocket 186. Interposed between the notches 194 are inwardly extending tabs 192. The exterior wall 188 the finishing strip 184 is of sufficient depth to contact the splash guard 50 and thereby completely hide the support arm 134 of the outer clip 130 from view when looking at the splash guard 50 from an exterior of the vehicle 10. The inwardly extending tabs 192 are sandwiched between the clip facing surface 58 of the splash guard mounting region 52 and the forward peripheral edge 40 of the mounting surface 34 of the rear bumper fascia 18. Saw-tooth surfaces on the front and back edges 135 of the support arm 134 of the outer clip 130 helps to maintain secure attachment of the support arm 134 within the pocket 186 of the finishing strip 184. As can best be seen in FIG. 8, in the regions of the notches 194, the rear facing wall 196 includes a short distal tongue portion 195 that wraps around the outer clip 130 and extends partially along the exterior wall 144 of the central planar portion 132 of the outer clip 130. Thus, the distal tongue portion 195 of the finishing strip rear facing wall 196 is interposed between the splash guard mounting region 52 and the outer clips 130 of the attachment clip assemblies 100a, 100b, 100c.

As can also be seen in FIG. 9, the finishing strip 184 may include a multiple notches 194 in the distal tongue portion 192 where attachment clip assemblies 100a, 100b, 100c may be positioned with respect to the finishing strip 184. The number of notches 194 in the finishing strip 184 may exceed three and include optional notch locations to allow for greater flexibility in terms of splash guard design. That is, different styles of splash guards may have their mounting region apertures 56 in different locations. The inclusion of optional notch locations allows for the finishing strip 184 to be used with different styles of splash guards. Finally, it is obvious that a single cover structure 180 is need to mount one splash guard, while a plurality of attachment clip assemblies 100a, 100b, 100c are required. Thus, the present disclosure contemplates a splash guard mounting kit 200 for mounting a splash guard 50 to a vehicle 10 comprising a cover structure 180 including the adhesive tape 182 and the finishing strip 184 and a plurality of attachment clip assemblies 100 each including the inner clip 110, the outer clip 130 and the fastener 150.

As used herein, terms of orientation and/or direction such as upward, downward, forward, rearward, upper, lower, inward, outward, inwardly, outwardly, horizontal, horizontally, vertical, vertically, distal, proximal, axially, radially, etc., are provided for convenience purposes and relate generally to the orientation shown in the Figures and/or discussed in the Detailed Description. Such orientation/direction terms are not intended to limit the scope of the present disclosure, this application and the invention or inventions described therein, or the claims appended hereto.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. An attachment clip assembly for securing a splash guard to a projecting edge portion of a vehicle panel, the attachment clip assembly comprising:

an inner clip, including a central portion, a gripping arm on one side of the central portion and a wedging arm on the opposite side of the central portion, the gripping arm extending in a direction transverse to the central portion and the wedging arm extending at an angle from the central portion, the central portion including an opening;

an outer clip, including a central portion, a support arm on one side of the central portion and a wedging arm on the opposite side of the central portion, the support arm extending in a direction transverse to the central portion and the wedging arm being angled outwardly from the central portion, the central portion including a slotted opening extending in a direction between the support arm and the wedging arm, the inner clip fitting in nested relationship in the outer clip;

a fastener extending through the opening of the inner clip and the slotted opening of the outer clip; and the wedging arms of the inner and outer clips interfitting such that, upon tightening the threaded fastener, the wedging arm of the inner clip contacts and slides along the wedging arm of the outer clip in a direction toward the central portion of the outer clip thereby moving the gripping arm of the inner clip in the direction of the support arm of the outer clip and securing a projecting edge portion of a vehicle panel in direct alignment between the gripping arm of the inner clip and the support arm of the outer clip.

2. The attachment clip assembly of claim 1 wherein the direction of the gripping arm of the inner clip is generally orthogonal to the central portion of the inner clip, the direction of the support arm of the outer clip is generally orthogonal to the central portion of the outer clip and the wedging arm of the inner clip extends at an angle to the central portion of the inner clip in a direction generally opposite to the direction of the gripping arm.

3. The attachment clip assembly of claim 1 wherein the outer clip includes a pair of spaced apart shoulders overlying respective outer edges of the wedging arm of the inner clip.

4. The attachment clip assembly of claim 1 wherein the fastener is a threaded fastener.

5. The attachment clip assembly of claim 1 wherein the wedging arm of the inner clip includes a scaled gripping surface facing the wedging arm of the outer clip and the wedging arm of the outer clip includes a scaled gripping surface facing the wedging arm of the inner clip, the respective scaled gripping surfaces providing a one-way ratcheting action as the wedging arm of the inner clip slides along the wedging arm of the outer clip in a direction toward the central portion of the outer clip.

6. The attachment clip assembly of claim 1 wherein the central portion of the inner clip is planar.

7. The attachment clip assembly of claim 1 wherein the central portion of the outer clip is planar.

8. The attachment clip assembly of claim 1 wherein the inner clip is generally Z-shaped.

9. The attachment clip assembly of claim 1 wherein the outer clip is generally U-shaped.

10. The attachment clip assembly of claim 1 further including an elongated finishing strip, the finishing strip including a slotted opening receiving the support arm of the outer clip.

11. A combination of a vehicle splash guard and an attachment clip assembly for securing the splash guard to a projecting edge portion of a vehicle panel, the combination comprising:

the splash guard including a mounting region; and
the attachment clip assembly including:
an inner clip, including a central portion, a gripping arm on one side of the central portion and a wedging arm on the opposite side of the central portion, the gripping arm being generally orthogonal to the central portion and the wedging arm extending at an angle from the central portion, the central portion including an opening;
an outer clip, including a central portion, a support arm on one side of the central portion and a wedging arm on the opposite side of the central portion, the support arm extending in a direction transverse to the central portion and the wedging arm being angled outwardly from the central portion, the central portion including a slotted opening extending in a direction between the support arm and the wedging arm, the inner clip fitting in nested relationship in the outer clip;
a threaded fastener extending through the opening of the inner clip and the slotted opening of the outer clip and further extending into the mounting region of the splash guard; and
the wedging arms of the inner and outer clips interfitting such that, upon tightening the threaded fastener, the wedging arm of the inner clip contacts and slides along the wedging arm of the outer clip in a direction toward the central portion of the outer clip thereby moving the gripping arm of the inner clip in the direction of the support arm of the outer clip and securing a projecting edge portion of a vehicle panel in direct alignment between the gripping arm of the inner clip and the support arm of the outer clip.

12. The combination of claim 11 wherein the direction of the gripping arm of the inner clip is generally orthogonal to the central portion of the inner clip, the direction of the support arm of the outer clip is generally orthogonal to the central portion of the outer clip and the wedging arm of the inner clip extends at an angle to the central portion of the inner clip in a direction generally opposite to the direction of the gripping arm.

13. The combination of claim 11 wherein the direction of the gripping arm of the outer clip is generally orthogonal to the central portion of the outer clip and the wedging arm of the inner clip extends at an angle to the central portion in a direction opposite to the direction of the gripping arm.

14. The combination of claim 11 wherein the fastener is a threaded fastener.

15. The combination of claim 11 wherein the wedging arm of the inner clip includes a scaled gripping surface facing the wedging arm of the outer clip and the wedging arm of the outer clip includes a scaled gripping surface facing the wedging arm of the inner clip, the respective scaled gripping surfaces providing a one-way ratcheting action as the wedging arm of the inner clip slides along the wedging arm of the outer clip in a direction toward the central portion of the outer clip.

16. The combination of claim 11 further including an elongated finishing strip, the finishing strip including a slotted opening receiving the support arm of the outer clip.

17. The combination of claim 11 wherein the central portion of the inner clip is planar.

18. The combination of claim 11 wherein the central portion of the outer clip is planar.

19. The combination of claim 11 wherein the inner clip is generally Z-shaped.

20. The combination of claim 11 wherein the outer clip is generally U-shaped.

21. The combination of claim 11 wherein the mounting region of the splash guard is substantially planar.

* * * * *